United States Patent
Leloup et al.

(10) Patent No.: US 6,824,749 B2
(45) Date of Patent: Nov. 30, 2004

(54) STACKED MONOLITH REACTOR AND PROCESS

(75) Inventors: Jérôme Leloup, Fontainebleau (FR); Didier Letourneur, Fontainebleau (FR); Maxime Moreno, Fontainebleau (FR); Pierre Woehl, Cesson (FR)

(73) Assignee: Corning Incorporated, Corning, NY (US)

( * ) Notice: Subject to any disclaimer, the term of this patent is extended or adjusted under 35 U.S.C. 154(b) by 7 days.

(21) Appl. No.: 10/029,738

(22) Filed: Dec. 18, 2001

(65) Prior Publication Data

US 2002/0076372 A1 Jun. 20, 2002

(30) Foreign Application Priority Data

Dec. 20, 2000 (EP) .............................................. 00403615

(51) Int. Cl.[7] .............................. B01J 8/04; B01J 8/00; B01J 35/00
(52) U.S. Cl. ........................ 422/220; 422/188; 422/189; 422/190; 422/193; 422/195; 422/211; 422/222
(58) Field of Search ................................. 422/168, 169, 422/170, 171, 176, 177, 180, 188–190, 193, 115, 211, 220, 222

(56) References Cited

U.S. PATENT DOCUMENTS

| | | | | |
|---|---|---|---|---|
| 3,208,131 A | * | 9/1965 | Ruff et al. ..................... | 29/890 |
| 3,785,781 A | * | 1/1974 | Hervert et al. ............... | 422/171 |
| 4,382,046 A | | 5/1983 | Frohwerk | |
| 5,514,347 A | | 5/1996 | Ohashi et al. | |
| 5,863,508 A | | 1/1999 | Lachman et al. | |
| 6,143,254 A | | 11/2000 | Erven et al. | |

FOREIGN PATENT DOCUMENTS

| | | | |
|---|---|---|---|
| DE | 3904550 | 8/1990 | |
| DE | 39 04 550 | 8/1990 | |
| DE | 4243424 | 6/1994 | |
| DE | 42 43 424 | 6/1994 | |
| DE | 197 06 544 | 3/1998 | |
| EP | 0 226 306 | 5/1991 | |
| JP | 57-150443 | 9/1982 | |
| JP | 57150443 | 9/1982 | |
| WO | WO 98/38147 | * 9/1998 | ............. C07C/1/04 |

OTHER PUBLICATIONS

Kawakami et al., "Performance of a Honeycomb Monolith Bioreactor—Gas–Liquid–Solid Three–Phase System", Ind. Eng. Chem. Res., vol. 28, No. 4, 1989, pp. 394–400.

Shiraishi et al., "Characterization of Production of Free Gluconic Acid by Gluconobacter suboxydans Adsorbed on Ceramic Honeycomb Monolith", Biotechnology and Bioengineering, vol. 33, May 1989, pp. 1413–1418.

* cited by examiner

Primary Examiner—Alexa Doroshenk
(74) Attorney, Agent, or Firm—Kees van der Sterre

(57) ABSTRACT

Methods and apparatus for treating a gas-liquid feed stream with structured monolithic catalysts of honeycomb configuration wherein the catalysts are configured as a stack of honeycomb sections with offset channels, the resulting channel dislocations between adjacent contacting honeycombs in the stack introducing controlled, limited turbulence and mixing of feed stream portions traversing the channels to significantly increase the catalytic efficiency of the reactor.

3 Claims, 2 Drawing Sheets

STACKED MONOLITH REACTOR AND PROCESS

BACKGROUND OF THE INVENTION

The present invention relates to methods and apparatus for the chemical processing of gas-liquid chemical reactant mixtures, and more particularly to chemical reactors and processes incorporating structured catalysts assembled from catalyst sections of monolithic honeycomb configuration for the processing of such mixtures.

Interest in the use of structured catalysts such as honeycombs for the processing of fluid chemical reactant streams in three-phase (gas-liquid-catalyst) reactions is increasing. Among the several applications being is considered for this technology are those involving co-current gas-liquid flow through the catalyst. In co-current flow both gas and liquid phases of a two-phase gas-liquid feed stream are passed concurrently and in the same direction through the honeycomb catalyst. What is desired in carrying out such a process is to sustain a flow regime which leads to high mass transfer coefficients in the monolithic structure.

One example of the use of structured catalysts in reactors for chemical processing is found in Published European patent application EP 0 226 306. That application describes a packing design for a chemical reactor employing an interlocking array of honeycomb catalysts having potential application for the processing of a variety of chemical feedstocks.

The interlocking catalyst arrangement described in that patent is designed to avoid catalyst-free pathways through the reactor while at the same time permitting some relative movement among the blocks of honeycomb catalyst. Catalyst movement occurs as the result of dimensional changes in the honeycombs and reactor vessel resulting from temperature differentials arising within the reactor during use.

Separate and orderly fluid flow through parallel honeycomb channels in the manner described in this patent has been considered desirable for many chemical reactions, since such flow fixes the distribution of the reactants and maximizes catalyst utilization. However, there are other chemical reactions that may benefit from more turbulent reactant flow. Thus U.S. Pat. No. 5,514,347 discloses honeycomb structures of complex wall configuration designed to increase flow turbulence and the exchange of chemical reactants among the channels of the honeycombs during use.

One disadvantage of complex honeycomb configurations, however, is high cost. Thus an inexpensive design or method for developing appropriate levels of reactant intermixing would be of interest for a number of chemical processing applications. And, such a design or method would be particularly useful if it permitted some degree of control over the extent of reactant redistribution within the catalyst bed, for example, to prevent undesirable feed stream disruptions causing high feed stream flow through some sections of the catalyst bed, with flow starvation and attendant catalyst under-utilization in other sections of the bed.

SUMMARY OF THE INVENTION

The present invention provides chemical reactor designs and processes employing structured catalysts of honeycomb shape. The structured catalysts are configured to achieve a controlled reactant feed stream redistribution that has been found quite effective for improving the conversion efficiency of the reactors. The reactors may be used for a variety of applications, but are particularly useful for carrying out three-phase reactions involving the co-current processing of gas-liquid feed streams over solid honeycomb catalysts.

The invention is based in part on the discovery that arranging the honeycomb catalyst packing to provide "closed" channel discontinuities in the honeycomb channels traversing the reactor increases the apparent activity of the catalyst. Closed channel discontinuities are discontinuities substantially free of unchanneled or unguided flow, such as the unguided flow that occurs in open chambers or spaces within conventional catalytic reactors for promoting random feed stream mixing.

Suitable channel discontinuities for the purpose of the invention are provided by rotating or displacing adjacent, flow-connected blocks of catalyst honeycombs having substantially the same cell density so that their channels are not aligned. The degree of rotation or offset will be sufficient to provide channel splitting, i.e., a flow pattern such that reactants exiting a channel in an upstream block will be sub-divided and redistributed among two or more adjoining channels in a downstream block that is flow-connected thereto.

The result of this flow pattern is significantly higher apparent catalytic activity than provided by equivalent volumes of catalyst with no channel discontinuities, or with conventional mixing sections, without significant added cost for the added catalytic activity. A further advantage of the approach is that the costs of added measures to insure channel alignment are entirely avoided. In fact, honeycomb orientations within the bed may be nearly random, since the effectiveness of the invention does not depend on the exact degree of channel misalignment between the upstream and downstream honeycombs.

Accordingly, in a first aspect, the invention includes an improved chemical reactor for treating a gas-liquid feed stream with structured monolithic catalysts of honeycomb configuration. A suitable reactor vessel for the containment of a structured monolithic catalyst bed and the processing of a reactant feed stream is first provided. Included within the reactor are two or more sections of structured honeycomb catalyst, including at least a first catalyst section and a second catalyst section disposed in substantially contacting or otherwise flow-connected end-to-end relationship with each other.

Each of the first and second catalyst sections will have an inlet end and an outlet end between which a plurality of parallel open-ended honeycomb channels bounded by channel walls with catalytically active wall surfaces extend. The channels of both sections are oriented along a common flow axis in a direction of feed stream flow running generally from the inlet port toward the outlet port of the reactor vessel.

To achieve the required controlled feed stream turbulence and mixing, the channels of the first and second catalyst sections are laterally but not axially offset from each other. This offset is achieved, for example, by rotating one of the honeycombs about the common flow axis at a rotation angle such that at least a majority of the channels in the first catalyst section open or empty at the outlet end thereof onto at least one channel wall section and at least two adjoining channel openings at the inlet end of the second catalyst section. Similar results can be achieved by laterally displacing one of the honeycombs with respect to the other in a direction transverse to the flow axis.

With either rotational or lateral honeycomb channel displacement, the channel offsets thus provided will result in channels in the first catalyst section emptying onto two or more adjoining channels in the second catalyst section. In all cases, however, the divided feed streams from the channels in the first section are constrained by the contacting relationship between the honeycombs to flow only into a limited set of adjoining channels in the second section. In this way the unguided flow and uncontrolled feed stream mixing such as occurs within mixing chambers provided in conventional catalyst beds are entirely avoided.

In a second aspect the invention may be seen to reside in an improved method for treating a two-phase gas-liquid feed stream with solid structured monolithic catalysts of honeycomb configuration. That method utilizes a reactor with two or more honeycomb sections such as above described to more efficiently process the gas-liquid feed stream.

In utilizing such a reactor to carry out the improved method, a gas-liquid feed stream passing through the catalyst bed within the reactor is directed past the inlet end of the first section of catalyst and into the plurality of honeycomb channels therein, this step effecting a division of the feed stream into a plurality of feed stream portions traversing the plurality of channels. Each of these feed stream portions is then reacted against the catalyst-containing channel walls of the channel as it traverses the first section of catalyst, and is discharged from the outlet end thereof as at least partially reacted feed stream portion.

The feed stream portions discharged from the channels of the first honeycomb section are not collected and recombined into a single feed stream for mixing, as in a conventional mixing section, but are instead conveyed directly into the second catalyst section. At that point, due to the lateral channel offset provided between the first and second honeycomb sections as above described, each of at least a majority of the feed stream portions emptying into the second catalyst section will be separated into smaller, subdivided feed stream portions. Where the honeycomb sections are in direct contact this separation will be caused by impingement of each feed stream portion upon one or more web segments forming the channel walls of the second section. The subdivided feed stream portions then pass with the subdivided feed streams from other upstream channels into the channels of the second honeycomb section for reaction against the channel walls thereof.

Apparent from the foregoing description is the fact that a reactant mixture flowing from the first catalyst section into the second catalyst section will be conveyed into the second section without any large-scale mass transfer of reactants in directions transverse to the common flow axis of the honeycombs. That is, since each of the feed stream portions that is subdivided at the inlet face of the second honeycomb section is constrained to empty only into a small collected set of channels (generally two, three or four adjoining channels) in the second catalyst section, only limited and controlled levels of turbulence and lateral intermixing will occur.

After passage through, and reaction within, the channels of the second catalyst section, the reacted feed streams may be merged into a collected stream for recirculation through the catalyst bed or discharged from the reactor. In axial flow arrangements, the collected stream may be further processed through other treating stages in downstream sections of the reactor prior to discharge, if desired.

Catalytic conversion processes carried out as above described are both economic and surprisingly efficient. An important advantage of this process is that levels of turbulence and intermixing effective to increase catalytic reactor efficiency are achieved without the need for separate flow distributors or mixers between the honeycomb catalyst stages within the reactor. Thus a good initial distribution of reactants into the first honeycomb section can be maintained throughout the entire length of following catalyst sections, if the sections are arranged in flow-connected relationship as hereinabove described.

DESCRIPTION OF THE DRAWINGS

The invention may be further understood by reference to the drawings, wherein.

DETAILED DESCRIPTION

Figure 1:
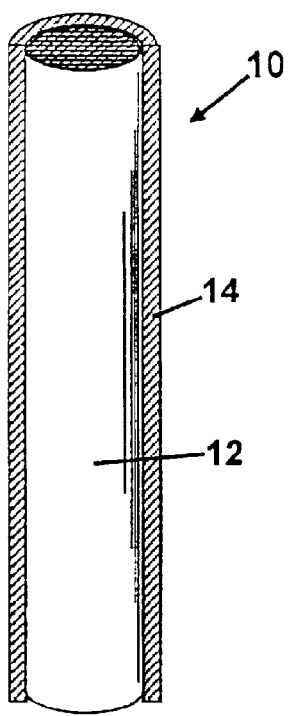
FIGS. 1 and 2 schematically illustrate prior art arrangements for positioning honeycomb catalysts within a reactor.

Chemical reactor technologies employing honeycomb monoliths are of particular interest for co-current gas-liquid flow processes wherein the gas and the liquid components of a reactant feed stream are conveyed in the same direction through the catalyst bed within the reactor core. The direction of co-current flow, whether upwardly is or downwardly through the reactor, is generally carried out in a flow regime which leads to high mass transfer coefficients in the monolithic structure. The reactors employed may be recirculating or batch-type reactors or, more typically, axial flow reactors wherein the chemical feed stream to be processed is conveyed into the reactor, conveyed along an axial flowpath through the catalyst bed, and discharged from the reactor or processed through downstream reactor stages for further treatment.

The flow regime commonly referred to as Taylor flow has been understood to provide the highest mass transfer coefficients. This is a flow regime wherein the gas and liquid proceed through the channels of the honeycomb in an organized procession of liquid slugs separated by gas bubbles, the bubbles being of the same order of magnitude in size as the liquid slugs and as the diameter of the honeycomb channels.

This understanding would suggest that the highest mass transfer efficiency, and thus the highest product yields, require the avoidance of disruptions in Taylor flow. To the contrary, the results of catalyst testing carried out by us using equivalent volumes of honeycomb catalyst arranged different ways within a reactor enclosure demonstrate that some disruptions are helpful, and thus that other honeycomb arrangements can be more efficient.

These results may be illustrated by a series of conversion runs wherein a honeycomb catalyst packing of fixed volume is tested first in the form of an integral or uninterrupted catalyst bed, and thereafter in various physical rearrangements of the same catalyst in the same reactor enclosure. Suitable honeycombs for carrying out such testing comprise ceramic honeycomb supports having a channel density of 400 square cells/in2 (62 cells/cm2) of honeycomb cross-sectional area. The cells of the honeycomb are bounded by channel walls of 0.006 inches (0.15 mm) thickness, and the channel walls are provided with a nickel catalyst dispersed uniformly on an alumina washcoat.

A comparison of the effectiveness of various physical rearrangements of this honeycomb catalyst may be made by measuring reactant conversion rates for each of a number of such rearrangements. For this purpose, a single reactant feed stream consisting of a solution of styrene in a toluene carrier, to be converted to a product stream comprising ethylbenzene, toluene, and unreacted styrene in the course of contact with the catalyst, may be employed.

To achieve high mass transfer efficiency for the reaction, the gas-liquid reactant feed stream is passed through the reactor in a co-current downflow mode at rates designed to develop and maintain Taylor flow within the channels of the honeycomb. Those flow rates are maintained unchanged throughout the remainder of the test runs for the same composition of catalyst.

Figure 2:
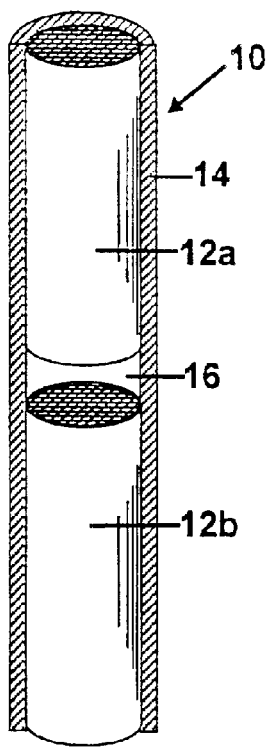

FIGS. 1 and 2 of the drawings schematically depict examples of conventional honeycomb catalyst arrangements of the type subjected to comparative testing. FIG. 1 of the drawing is a partial cutaway view of a portion of a chemical reactor 10 wherein a single length of honeycomb catalyst 12 is disposed within a steel reactor enclosure 14. In this arrangement catalyst 12 provides a unitary uninterrupted catalyst bed.

FIG. 2 of the drawing illustrates a second reactor test configuration wherein a unitary honeycomb such as shown in FIG. 1 is divided into two approximately equal lengths of catalyst comprising an upstream catalyst is section 12a and a downstream catalyst section 12b. In the arrangement of FIG. 2 the combined length of catalyst sections 12a and 12b is equal to the length of the unitary honeycomb section of FIG. 1, so that the volume of the catalyst remains unchanged. However, the two sections in FIG. 2 are separated by a spacing interval or chamber 16 within enclosure 14.

A spacing interval such as chamber 14 in FIG. 2 forms a mixing chamber of the kind conventional in the art for use in chemical reactors. Such chambers are typically provided to promote extensive mixing and redistribution of feed stream reactants and partial products entering the chamber prior to further processing in downstream catalyst or other treatment sections of the reactor.

Figure 3:
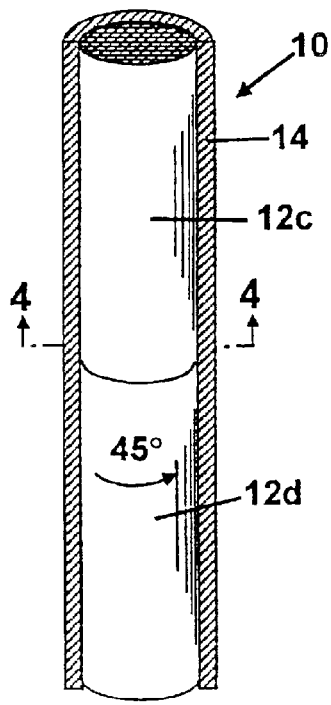
FIGS. 3 and 4 schematically illustrate one honeycomb catalyst arrangement providing improved reaction efficiency in accordance with the invention.

FIG. 3 of the drawings schematically illustrates a catalyst arrangement provided in accordance with the invention, wherein two catalyst sections 12c and 12d of the same size as sections 12a and 12b in FIG. 2 are arranged in contacting but rotationally offset relationship with one another. In this arrangement, bottom honeycomb catalyst section 12d is rotated through an angle of about 45° about a common flow axis F through the honeycombs so that the square honeycomb channels of bottom section 12d are not aligned, but are instead offset, from the square channels of top section 12c.

Figure 4:
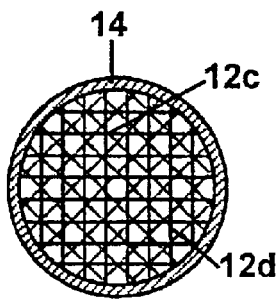

The nature of the channel offset resulting from the axial rotation of catalyst section 12d with respect to catalyst section 12c is schematically illustrated in FIG. 4 of the drawing. FIG. 4 presents a schematic view of cross-section 4—4 through reactor 10 in FIG. 3. The channel locations of lower honeycomb section 12d are shown in phantom below the channel locations of top honeycomb section 12c.

As can be seen from an inspection of FIG. 4, the result of the controlled channel offset provided by the catalyst arrangement of FIG. 3 is that most of the downflowing reactant stream portions emptying from the channels of section 12c into section 12d are divided and separated by the channel walls of section 12d into two or more smaller streams. These smaller streams enter two or more adjoining channels in downstream section 12d whereupon a limited recombination of the smaller streams with smaller streams from other divided portions occurs.

Flow stream division and recombination as described creates minor turbulence in the reactant stream and effects a local redistribution with limited mixing among the reactant stream portions as they traverse the boundary between the sections of catalyst. Taylor flow within the channels of section 12c will be disrupted in the course of the transition from the upstream to the downstream honeycomb, but could later be re-established in downstream section 12d. Downstream Taylor flow reestablishment will be favored since the feed stream velocity and the ratio of gas to liquid in the feed stream are not changed in the transition, and because large scale feed stream redistributions that could cause starvation of some channels and excessive feed stream flow through others are prevented by the contacting relationship between the catalyst sections.

Figure 5:
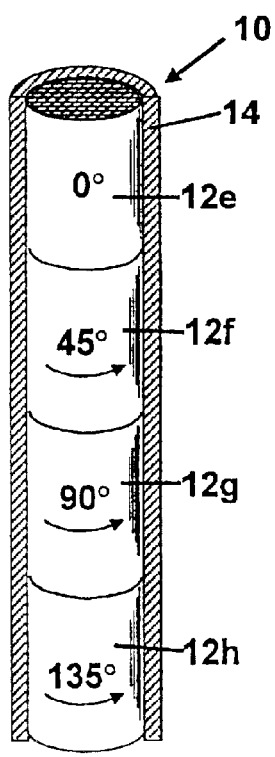
FIG. 5 schematically illustrates a second honeycomb catalyst arrangement providing improved reaction efficiency in accordance with the invention.

FIG. 5 of the drawings schematically illustrates a reactor section 10 incorporating honeycomb arrangement similar in function to that of FIG. 3, but wherein each of the two honeycomb sections of FIG. 3 is further divided and rotated to form a stacked catalyst bed of four contacting but rotationally offset honeycomb catalysts 12e–12h. The rotation angles of each catalyst section from the 0° rotation position of catalyst section 12e are shown on each of sections 12f, 12g and 12h. Again, the total volume of catalyst remains unchanged from that of FIGS. 1–3, but the transitional splitting and redistribution of the reactant stream in the catalyst bed of FIG. 5 occurs three times over the flow path from the top to the bottom of the catalyst stack.

Figure 6:
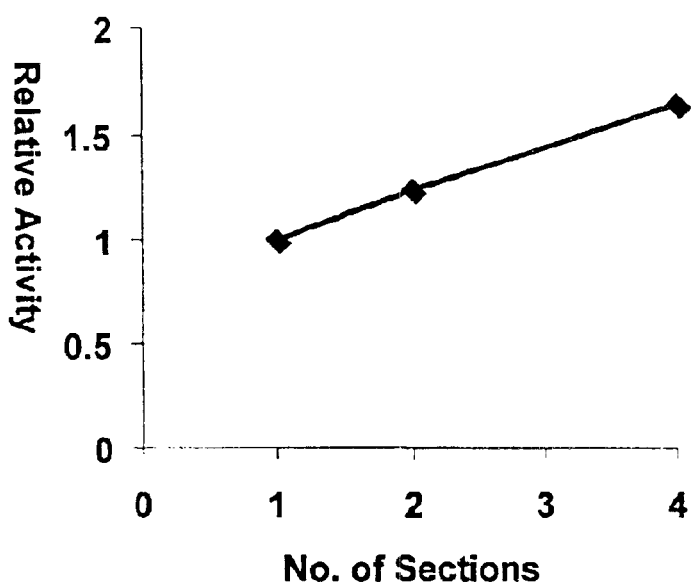
FIGS. 6 and 7 are graphs illustrating the effects of honeycomb catalyst rearrangement on catalytic activity.

The unexpected effect of the controlled stream splitting and redistribution occurring in the process carried out over the honeycomb catalyst beds of FIGS. 3 and 5 is an increase rather than a decrease in the effective activity of the catalyst bed. FIG. 6 of the drawings is a bar graph comparing the relative catalytic activities that will be observed for the conversion of styrene to ethylbenzene in a toluene carrier over honeycomb-supported nickel catalyst beds configured as in FIGS. 1, 3 and 5 of the drawings. The relative activities of each of the beds, expressed as a ratio of the catalytic activity of the tested bed to the activity of a unitary catalyst bed of the same honeycomb design such as illustrated in FIG. 1, is shown on the vertical axis of the graph, and the number of catalyst beds employed is shown on the horizontal axis of the graph.

As is evident from a study of FIG. 6, the apparent activity of a given volume of catalyst increases with increasing section count over the range from one to four catalyst sections covered by the graph. For this particular reaction the activity increase is in excess of 25% for the division of a single catalyst section into two offset catalyst sections, with still greater increases resulting from further sectioning.

Figure 7:
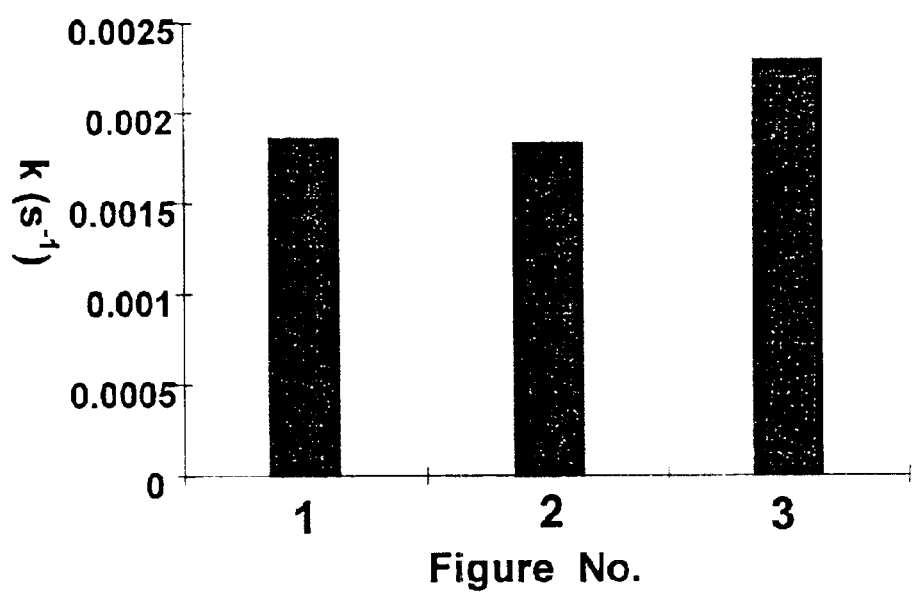

It does not appear that activity enhancements such as reported in FIG. 6 can be realized in honeycomb catalyst beds incorporating conventional open mixing chambers such as shown in FIG. 2. FIG. 7 of the drawings presents a bar graph comparing a representative styrene/ethylbenzene conversion activity for a unitary catalyst bed 1 such as shown in FIG. 1 of the drawing with a second catalyst bed 2 incorporating an equivalent catalyst volume but divided by a conventional mixing chamber, as in FIG. 2 of the drawing.

Also included for comparison is a catalyst bed 3 of the same volume, but divided into to two contacting sections as illustrated in FIG. 3 of the drawings. The honeycomb sections of catalyst bed 3 are rotationally offset 45° rotationally from each other, with no mixing chamber provided between the sections.

The vertical axis of the graph of FIG. 7 provides a scale for comparing the effective catalytic activities (k) of the three catalyst beds tested, the activities being shown by the heights of the labeled bars 1, 2 and 3 for each of the respective catalysts. As is apparent from the data plotted in FIG. 7, the effective catalytic activity of catalyst bed 2, incorporating a conventional mixing chamber between adjacent bed sections, is substantially the same as the activity of catalyst bed 1, the unitary honeycomb catalyst bed. In contrast the effective activity of catalyst bed 3, comprising the same volume of catalyst divided into two contacting but channel-offset sections, is approximately 25% higher than the activity of either of beds 1 or 2.

An important factor contributing to the practical effectiveness of the invention is the fact that channel offsets of the kind hereinabove described can be provided without significantly increasing the pressure drop across the reactor catalyst bed. This conclusion is based on careful comparisons of iso-pressure drop maps generated on both unitary and channel offset honeycomb beds over broad ranges of gas and liquid flow rate. The iso-pressure data show almost no increase in pressure drop to be associated with the sectioning of a unitary catalyst bed into two channel-offset sections having a 45° rotational offset from one another.

The improved catalyst activity and reactor performance provided by the invention are not expected to depend strongly on the particular type of channel offset employed. Rotational and lateral offsets, as well as offsets arising from predetermined differences in channel size, shape or spacing as between adjacent catalyst sections, are expected to be equivalently effective.

Figure 8:
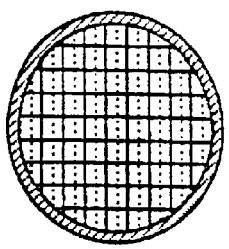
FIGS. 8 and 9 schematically illustrate additional honeycomb catalyst arrangements providing improved reaction efficiency in accordance with the invention.
Figure 9:
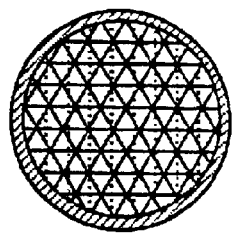

FIGS. 8 and 9 of the drawings provide representative examples of offsets that can be used as alternatives to the rotational offset shown in FIG. 4. FIG. 8 presents a schematic cross-section of the transition region within a two-section honeycomb stack wherein the square channels of the lower honeycomb in the stack (shown in phantom) are offset laterally to the left of the square channels of the upper honeycomb section. FIG. 9 is a schematic cross-sectional view of a two-section stack transition wherein the channel offset arises from the fact that the walls of the square channels of the lower honeycomb (shown in phantom) transect the triangular channel outlets of the upper honeycomb. Of course these illustrations are merely representative of the various channel offsets and channel shapes that can be used; hexagonal, sinusoidal, random, or any of a variety of other shapes, in substitution for or in addition to square and triangular channel shapes, may be employed.

As previously indicated, the most economic arrangement of adjacent, channel-offset catalyst sections in a reactor bed for co-current flow operation is a direct-contact arrangement. Such an arrangement does not require special honeycomb mounting hardware, and can be used whenever the conditions of reactor operation do not involve extreme mechanical vibrations or reactant flow pressures high enough to result in relative movement and unacceptable abrasion or other physical damage to the catalyst sections.

For applications where direct physical contact between honeycomb catalyst sections is inadvisable, other flow-connected arrangements may be used. For the purpose of the present description, other flow-connected arrangements include arrangements wherein channeled separating layers or coatings are positioned between adjacent honeycombs, e.g. to minimize abrasion therebetween, while still maintaining the desired channel offsets between sections. Suitable channeled separators may comprise coatings, wafers or gaskets formed of chemically durable organic or materials that can be applied, shaped or perforated to match the channel outlet pattern of one of the honeycombs, thereby simply extending the honeycomb channels thereof without affecting channel offset or feed stream separation and redistribution.

While the foregoing description and examples set forth specific illustrations of the practice of the invention and its wide applicability to a variety of chemical reactor designs and processes, those illustrations are intended to be representative only. Thus it will be apparent that numerous modifications and variations upon the designs and processes particularly described herein may be resorted to by those skilled in the art within the scope of the appended claims.

What is claimed is:

1. In the method for treating a gas-liquid feed stream in a structured monolithic catalyst reactor wherein a feed stream of combined gas and liquid is brought into contact with a honeycomb catalyst bed made up of multiple honeycomb sections, each section comprising parallel, open-ended honeycomb channels bounded by catalyst-containing channel walls extending from an inlet end to an outlet end thereof, the channels of both sections lying parallel to a common flow axis through the reactor, the improvement wherein:

the feed stream is directed past the inlet end and through a plurality of the honeycomb channels of the first section of catalyst as a plurality of feed stream portions, the feed stream portions comprising gas and liquid in a proportion effective to develop Taylor flow conditions within the honeycomb channels;

the feed stream portions are reacted against the catalyst-containing channel walls of the first section of catalyst and then discharged from the outlet end thereof;

each of a majority of the discharged feed stream portions is separated at the inlet end of the second section of catalyst into subdivided feed stream portions that are directed into a set of at least two parallel adjoining channels in the second catalyst section, the first and second catalyst sections being arranged in flow-connecting, end-to-end relationship with each other such that unchanneled flow of the feed stream portions is avoided;

the subdivided feed stream portions are reacted against the catalyst-containing walls of the second catalyst section; and the thus-reacted subdivided feed stream portions are discharged from the second catalyst section.

2. A method in accordance with claim 1 wherein the feed stream portions are subdivided by the channel walls of the second catalyst section into from 2 to 4 subdivided feed stream portions at the inlet face of the second catalyst section.

3. A method in accordance with claim 1 wherein the gas and liquid are passed through the reactor in a co-current downflow mode.

* * * * *